United States Patent [19]
Chen

[11] Patent Number: 5,893,035
[45] Date of Patent: Apr. 6, 1999

[54] CENTRALIZED FORWARD LINK POWER CONTROL

[75] Inventor: Tao Chen, San Diego, Calif.

[73] Assignee: QUALCOMM Incorporated, San Diego, Calif.

[21] Appl. No.: 710,335

[22] Filed: Sep. 16, 1996

[51] Int. Cl.⁶ .................................................. H04B 7/005
[52] U.S. Cl. ............................ 455/522; 455/69; 455/442
[58] Field of Search ............................... 455/69, 522, 442, 455/70, 92, 63, 127, 67.1, 517, 524, 507, 561

[56] References Cited

U.S. PATENT DOCUMENTS

| | | |
|---|---|---|
| 3,310,631 | 3/1967 | Brown . |
| 3,715,508 | 2/1973 | Blasbalg . |
| 4,052,565 | 10/1977 | Baxter et al. . |
| 4,112,257 | 9/1978 | Frost . |
| 4,123,718 | 10/1978 | Lampert et al. . |
| 4,222,115 | 9/1980 | Cooper et al. . |
| 4,225,976 | 9/1980 | Osborne et al. . |
| 4,291,409 | 9/1981 | Weinberg et al. . |
| 4,301,530 | 11/1981 | Gutleber . |
| 4,460,992 | 7/1984 | Gutleber . |
| 4,472,815 | 9/1984 | Gutleber . |
| 4,495,648 | 1/1985 | Giger . |
| 4,580,262 | 4/1986 | Naylor et al. . |
| 4,635,221 | 1/1987 | Kerr . |
| 4,641,322 | 2/1987 | Hasegawa . |
| 4,672,658 | 6/1987 | Kaverad et al. . |
| 4,688,035 | 8/1987 | Gray et al. . |
| 4,730,340 | 3/1988 | Frazier, Jr. . |
| 4,765,753 | 8/1988 | Schmitdt . |
| 4,813,040 | 3/1989 | Futato . |
| 4,872,200 | 10/1989 | Jansen . |
| 4,901,307 | 2/1990 | Gilhousen et al. . |
| 4,933,952 | 6/1990 | Albrieux . |
| 4,939,745 | 7/1990 | Kirimoto et al. . |
| 5,003,533 | 3/1991 | Watanabe . |
| 5,022,046 | 6/1991 | Morrow, Jr. . |
| 5,029,331 | 7/1991 | Heichler et al. . |
| 5,056,109 | 10/1991 | Gilhousen et al. . |
| 5,068,849 | 11/1991 | Tanaka . |

(List continued on next page.)

FOREIGN PATENT DOCUMENTS

| | | |
|---|---|---|
| 0412583 | 3/1986 | European Pat. Off. . |
| 0418865 | 9/1990 | European Pat. Off. . |
| 0444592 | 2/1991 | European Pat. Off. . |
| 0564937 | 10/1993 | European Pat. Off. . |
| 3035625 | 2/1991 | Japan . |
| 2022365 | 5/1979 | United Kingdom . |
| 2182528 | 10/1986 | United Kingdom . |
| 2273009 | 6/1994 | United Kingdom . |
| 9107030 | 10/1990 | WIPO . |
| 9406218 | 3/1994 | WIPO . |
| 9609696 | 3/1996 | WIPO ............................ H04B 7/005 |

OTHER PUBLICATIONS

*Advanced Engineering Mathmatics*, "Orthogonal Sets of Functions/Chapter 4", Erwin Kreyszig, pp. 186–190, John Wiley & Sons, Inc.

Primary Examiner—Reinhard J. Eisenzopf
Assistant Examiner—Lester G. Kincaid
Attorney, Agent, or Firm—Russell B. Miller; Bruce W. Greenhaus

[57] ABSTRACT

In a mobile communication system comprising at least two base stations coupled to a common base station controller, each base station with which a particular mobile station is communicating sends its received frame quality message to the common base station controller. The base station controller combines the received messages to provide an improved estimate of the correct message and thus a correct power level for the forward link signal. Each base station preferably responds independently to error messages it receives from the mobile station and also sends the error message to the base station controller. After receiving power control commands from the base station controller, the base station then determines whether it responded properly at the time when it received the error message from the mobile station.

21 Claims, 6 Drawing Sheets

U.S. PATENT DOCUMENTS

| | | |
|---|---|---|
| 5,101,501 | 3/1992 | Gilhousen et al. . |
| 5,103,459 | 4/1992 | Gilhousen et al. . |
| 5,128,965 | 7/1992 | Henriksson . |
| 5,136,586 | 8/1992 | Greenblatt . |
| 5,157,672 | 10/1992 | Kondou et al. . |
| 5,159,608 | 10/1992 | Falconer et al. . |
| 5,204,876 | 4/1993 | Bruckert et al. . |
| 5,212,684 | 5/1993 | MacNamee et al. . |
| 5,220,678 | 6/1993 | Feei . |
| 5,245,629 | 9/1993 | Hall . |
| 5,257,404 | 10/1993 | Goreham et al. ............... 455/69 |
| 5,258,983 | 11/1993 | Lane et al. . |
| 5,263,050 | 11/1993 | Sutterlin et al. . |
| 5,267,262 | 11/1993 | Wheatley, III . |
| 5,283,780 | 2/1994 | Schuchman et al. . |
| 5,299,229 | 3/1994 | Zscheile et al. . |
| 5,305,468 | 4/1994 | Bruckert et al. . |
| 5,383,219 | 1/1995 | Wheatley, III et al. . |
| 5,390,338 | 2/1995 | Bodin et al. . |
| 5,455,967 | 10/1995 | Amezawa et al. ............... 455/69 |
| 5,465,399 | 11/1995 | Oberholtzer et al. . |
| 5,487,180 | 1/1996 | Ohtake . |
| 5,542,107 | 7/1996 | Kay ............... 455/522 |
| 5,574,975 | 11/1996 | Hill ............... 455/522 |
| 5,574,983 | 11/1996 | Douzono et al. ............... 455/522 |
| 5,604,766 | 2/1997 | Dohi et al. ............... 455/69 |

CENTRALIZED FORWARD LINK POWER CONTROL

BACKGROUND OF THE INVENTION

I. Field of the Invention

The present invention relates to communication systems. More particularly, the present invention relates to a novel and improved method and apparatus for providing forward power control in a mobile communication system.

II. Description of the Related Art

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation techniques of CDMA has significant advantages over other modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention and is incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM," also assigned to the assignee of the present invention and is incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a mobile user or mobile station through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501 entitled "METHOD AND SYSTEM FOR PROVIDING A SOFT HANDOFF IN COMMUNICATIONS IN A CDMA CELLULAR TELEPHONE SYSTEM," and U.S. Pat. No. 5,109,390 entitled "DIVERSITY RECEIVER IN A CDMA CELLULAR TELEPHONE SYSTEM," both assigned to the assignee of the present invention and incorporated by reference herein.

If the transmission power of signals transmitted by the base station to a mobile station are too high, it can create problems such as interfering with other mobile stations. Alternatively, if the transmission power of signals transmitted by the base station are too low, then the mobile station can receive multiple erroneous frames. Terrestrial channel fading and other known factors can affect the transmission power of signals transmitted by the base station. As a result, each base station must rapidly and accurately adjust the transmission power of the signals which it transmits to the mobile stations.

In a useful method for controlling the transmission power of signals transmitted by a base station, the mobile station transmits a signal to the base station when a transmitted frame of data is received in error. In response to this message, the base station increases its transmission power for signals transmitted by the base station. A method and apparatus for controlling transmission power is disclosed in U.S. Pat. No. 5,056,109, entitled "METHOD AND APPARATUS FOR CONTROLLING TRANSMISSION POWER IN A CDMA CELLULAR TELEPHONE SYSTEM" (the '109 patent), assigned to the assignee of the present invention and incorporated by reference herein.

A delay necessarily exists under the above CDMA closed loop communication system. The delay is the time between the time the base station transmits the frame with inadequate power and the time when, in response to an indication from the mobile station, the base station adjusts its transmission power. The delay includes the time when the base station transmits the frame with inadequate power, when the mobile station receives the erroneous frame, when the mobile station recognizes the error (e.g., a frame erasure), when the mobile station transmits the error message to the base station, and when the base station receives the error message and appropriately adjusts its transmission power. The CDMA communication system typically transmits packets of data as discrete frames. As a result, the CDMA communication system cannot rapidly compensate for transmission power fluctuations.

In order to optimize the transmission power of the base station, it is desirable for transmission power to be controlled by a centralized base station controller (BSC). However, centralized power control introduces an additional delay in the round trip path from the base station to the BSC, with the received information fed back, and from the BSC back to the base station. Therefore, a need is felt for a method to reduce the additional delay incurred by providing BSC power control while retaining the benefits of such a system.

SUMMARY OF THE INVENTION

The present invention is a novel and improved method of providing power control in a mobile communication system which is particularly advantageous in multiple base station or multi-cell environments. In multi-cell environments, multiple base stations are typically coupled to a single base station controller. The base station controller monitors each of the base stations, and coordinates handoff between base stations as the mobile station moves between cells. In a preferred embodiment, handoff is provided by a soft handoff method where communication is established with a base station when entering a new cell before dropping communication with the base station covering the cell being exited. In a soft handoff environment, a mobile station is communicating with two base stations when it is close to a cell boundary. The base station controller under the present invention preferably receives the error signal from the mobile station and provides a correction signal or transmission power command to the base station or base stations for transmissions to that mobile station in response thereto. As a result, the base station controller preferably determines the power of transmissions for the base station or base stations. However, if the base stations participate in the process, the response time is reduced for changes in the forward link.

The mobile station sends frame quality messages, for example, a frame error message, indicating the quality of the channel to the base station. The base station receives these messages and sends them to the base station controller. In response to these messages, the base station controller determines the transmission power of the forward link signals transmitted from the base station or base stations in communication with the mobile station, and sends commands indicating the determined transmission power to the base station or base stations. Each base station can then determine whether it is necessary to adjust the power of its transmissions in response to the commands.

In the exemplary embodiment, the commands sent from the base station controller include two parameters. One is a computed transmission power value for the signal being transmitted by each base station in communication with the mobile station and the other is a timer value. The timer value indicates a period of time during which the base station will not respond actively to requests to increase the transmission power from the mobile station. A reason for the timer parameter is the time delay or lag between the time when the base station receives the request to increase transmission power (i.e., receives an error message) and the time when the base station receives the reports from the mobile station in response to the increased transmission power.

Providing for the control of the transmission power in a base station controller has special benefits when a mobile station is in the soft handoff condition. As noted above, in soft handoff the mobile station is in communication with more than one base station. In this condition, each base station with which the mobile station is communicating sends its received frame quality message to a common base station controller. The base station controller combines the received messages to provide an improved estimate of the correct message and thus a correct power level for the forward link signal.

When a mobile station is in communication with more than one base station, the combined frame error rate of all reverse links to all base stations is different from the individual frame error rate of any one reverse link to a single base station. Thus, if the target frame error rate of the system is 1%, then a mobile station communicating with two base stations could be communicating with a 10% error rate to each of the base stations, which, assuming statistical independence, would yield a combined frame error rate of approximately 1%. However, when a mobile station is communicating with a base station at a frame error rate of 10%, then one out of ten of the frame quality messages are lost. By distributing the power control to a base station controller, the frame quality messages can be combined to minimize the number of frame quality messages that are lost and to provide for a better basis for transmission power adjustment.

Although the power control system of the present invention will be described, at times, in the context of a mobile station in a soft handoff condition, the present invention is equally applicable to situations where a mobile station is communicating only with one base station. Moreover, if the base station controller controls the transmission power of signals to mobile stations in soft handoff, then allowing the base station controller to control the power of all signals provides improved accuracy and efficiency in the overall control of transmission power for the communication system.

One of the difficulties in having the base station controller control transmission power is an additional delay that occurs in such a system. The additional delay results from the round trip delay of signals from the base station to the base station controller and back, and additional computational and timing difficulties that result from distributing the power control process. The total of these additional delays are typically on the order of two frames. In the present invention, the base station preferably responds independently to error messages it receives from the mobile station and also sends the error message to a base station controller.

The base station controller generates and provides to the base station power control commands which, as described above, include the timer value and the transmission power value for forward link signals. The base station then determines whether it responded properly at the time when it received the error message from the mobile station. If there is a discrepancy between either the transmission power value or the timer value, the base station will produce corrected values for the transmission power and timer values based upon the corrected values supplied by the current base station power control commands.

In a broad sense, the present invention embodies a communication system having at least a first base station, a base station controller, and at least one user station. A system user of the user station transmits to and receives from the first base station communication signals. A method for controlling transmission signal power of transmitted communication signals for each base station includes the steps of: (a) at the first base station, receiving a signal quality message from the user station, the signal quality message indicating a quality of a communication signal received by the user station from the first base station; (b) at the first base station, transmitting a first signal quality signal to the base station controller, the first signal quality signal being based on the received signal quality message; (c) at the base station controller, calculating a first power level command based on the first signal quality signal; (d) at the base station controller, transmitting the first power level command to the first base station; and (e) at the first base station, transmitting the communication signal at a first power level based on the first power level command.

The present invention also embodies a communication system having a base station controller and at least one user station, wherein the user station transmits and receives communication signals, and transmits a signal quality message indicating a quality of the received communication signals. A base station for the communication system includes a transmitter, a receiver, a power command receiver and a power control processor. The transmitter transmits the communication signals to the user station at a power level. The receiver receives the signal quality message from the user station, wherein the signal quality message at times provides an indication to change the power level. The power command receiver is configured to receive from the base station controller a transmission power value and a timer value. The power control processor alters the power level of the communication signals transmitted by the transmitter based on the transmission power value or the signal quality message. The power control processor also prohibits the power level from increasing during a period based on the timer value despite the indication by the signal quality message to change the power level.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A communication system, and in particular, a power control apparatus and method for this system, is described in detail herein. In the following description, numerous specific details are set forth such as specific number of bits, changes in power levels of transmission signals, etc., in order to provide a thorough understanding of the present invention. One skilled in the relevant art, however, will readily recognize that the present invention can be practiced without these specific details, or can readily be altered to include other bits, power levels, etc., from those described herein. In other instances, known structures are not shown or described in detail in order to avoid obscuring the present invention.

Figure 1:
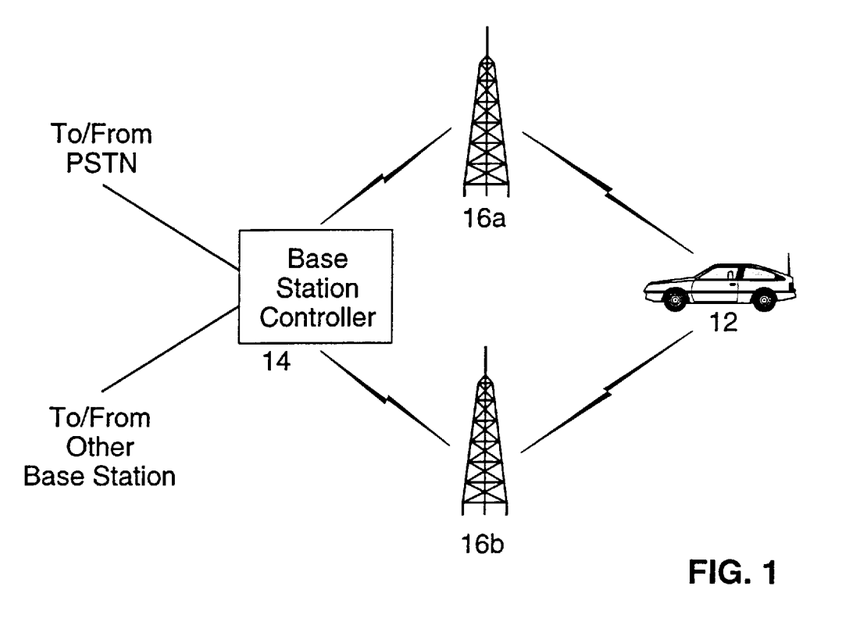
FIG. 1 illustrates a general closed loop power control system of the present invention.

FIG. 1 illustrates exemplary cellular subscriber communication system 10 in which the present invention may be embodied. The system of FIG. 1 preferably utilizes spread spectrum modulation techniques such as CDMA for communicating between users of mobile stations (e.g., mobile telephones) and cell-sites or base stations. In FIG. 1, mobile station 12 communicates with base station controller 14 by means of one or more base stations 16a, 16b, etc. Base station controller 14 is coupled to and typically includes interface and processing circuitry for providing system control to base stations 16a and 16b, as described below. Base station controller 14 can also be coupled to and communicate with other base stations, and possibly even other base station controllers.

When system 10 is configured to process telephone calls, base station controller 14 routes telephone calls from a public switched telephone network (PSTN) to an appropriate base station 16 for transmission to the appropriate mobile station 12. Also, base station controller 14 functions to route calls from mobile station 12 via at least one base station 16a or 16b to the PSTN. Base station controller 14 can furthermore connect calls between mobile station 12 and other mobile stations (not shown).

Base station controller 14 can be coupled to base stations 16a and 16b by various means such as dedicated telephone lines, optical fiber links or microwave communication links. Double-arrowed lines shown in FIG. 1 define the possible communication links between mobile station 12 and base stations 16a and 16b, and between base stations 16a and 16b and base station controller 14.

Each of base stations 16a and 16b provides service to a roughly defined but overlapping geographical region known as a cell. In which cell mobile station 12 is currently located will, in general, determine which base station 16a or 16b communicates with the mobile station. When mobile station 12 moves from one cell to another, then base station controller 14 will coordinate a handoff from one base station to another, for example, from base station 16a to base station 16b. Those skilled in the art will recognize that a handoff may occur for other reasons besides movement of mobile station 12 from one geographic cell site to another such as changes in system usage of the propagator path.

Figure 2:
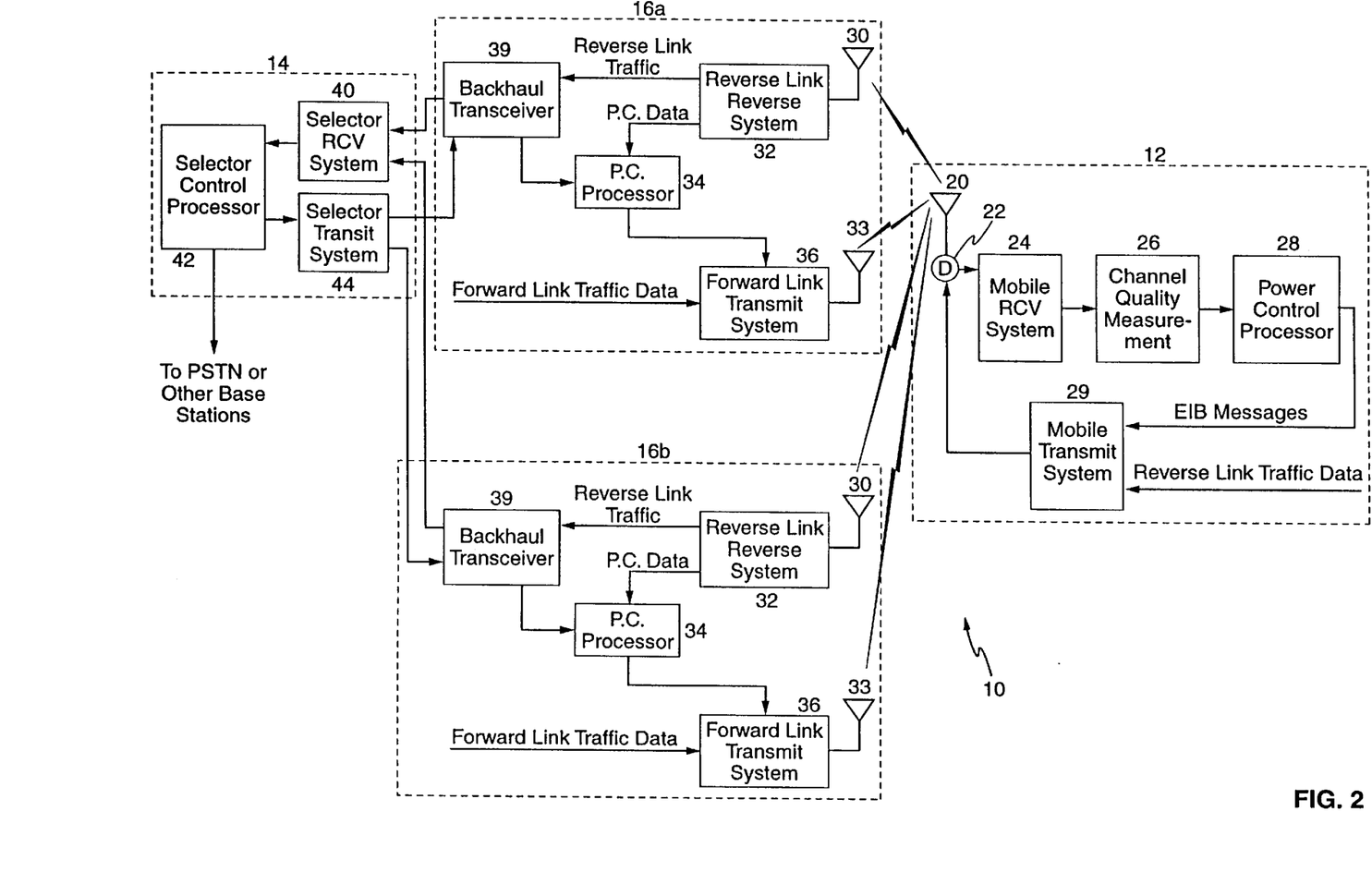
FIG. 2 is a block diagram of the closed loop power control system of FIG. 1.

FIG. 2 illustrates the case where mobile station 12 is in soft handoff between the cell covered by base station 16a and the cell covered by base station 16b. It will be understood that the description is easily extended to the case where only one base station 16a or 16b is in communication with mobile station 12 and to the case where more than two base stations are in communication with mobile station 12.

Referring to the block diagram of communication system 10 in FIG. 2, mobile station 12 includes antenna 20 that transmits signals to, and receives signals from, base stations 16a and 16b. Duplexer 22 provides a forward link channel or signal from base stations 16a and 16b to mobile receiver system (mobile RCV system) 24. Receiver system 24 downconverts, demodulates and decodes the received signal. Receiver system 24 then provides a predetermined parameter or set of parameters to quality measurement circuit 26. Examples of parameters might include measured signal to noise ratio (SNR), measured received power, or decoder parameters such as symbol error rate, Yamamoto metric or parity bit check indication. Channel quality measurement circuit 26 receives the parameters from mobile receiver system 24 and determines a quality measurement for the received signal. For example, quality measurement circuit 26 can determine whether a frame in the received signal contains errors or is erased or could determine whether the SNR or received signal power exceed a predetermined acceptance threshold or set of thresholds.

Power control processor 28 receives a quality measurement signal from quality measurement circuit 26 and produces a frame quality message. In the exemplary embodiment, quality measurement circuit 26 determines whether the frame was received in error and power control processor 28 generates an erasure indicator bit (EIB) that indicates whether the received frame contains an erasure. For example, an EIB binary value of "0" can indicate a properly received frame, while a value of "1" can indicate an erased frame.

Mobile transmission system 29 (Mobile Transmit System) encodes, modulates, amplifies and upconverts the frame quality message via duplexer 22 and antenna 20. In the exemplary embodiment, mobile transmission system 29 provides the EIB in a predetermined location of an outgoing reverse link frame. Mobile transmission system 29 also receives reverse link traffic data which can correspond to voice data from the user of mobile station 12. While mobile station 12 is generally described herein as producing and transmitting EIB messages, the mobile station can provide more thorough frame quality messages (rather than a single bit per frame) as will be appreciated by those skilled in the relevant art based on the detailed description provided herein. For example, mobile station 12 could transmit a quantized value of the measured received power or measured SNR.

Each base station 16a and 16b includes receiving antenna 30 that receives the reverse link frames from mobile station 12. Receiver systems 32 of base stations 16a and 16b downconvert, amplify, modulate, decode and provide the reverse link traffic to backhaul transceiver 39. In addition, each receiver system 32 separates the frame quality message from the reverse link traffic frame and provides the frame quality message to power control processor 34.

As will be appreciated below, the frame quality message provides an indication of the power level of the forward link signal. In the exemplary embodiment, the frame quality message is an error indicator bit (EIB). If the EIB message has a value of 1, indicating an erasure, then power control processor 34 determines that the gain or power level of the forward link signal should be increased. Conversely, if the EIB has a value of 0, indicating a properly received frame, the power control processor determines that the transmission power should be maintained or incrementally decreased.

Power control processor 34, under a routine described below, monitors the EIB message and produces a forward link transmitter power signal to forward link transmitter system 36. Forward link transmitter system 36, in response thereto, either increases or decreases the forward link signal. The forward link signal is then transmitted via transmitting antenna 38. Forward link transmitter system 36 also receives forward link traffic data which it encodes, modulates and transmits via antenna 38. In the exemplary embodiment, mobile receiver system 24, mobile transmitter system 29, receiver system 32, and forward link transmitter system 36 are either CDMA receivers or transmitters as described in the aforementioned U.S. Pat. Nos. 4,901,307 and 5,103,459.

Backhaul transceiver 39 in each base station 16a and 16b provides either the received reverse link frame estimate or an indication that the reverse link frame was erased to selector receiver system 40 in base station controller 14. Importantly, selector receiver system 40 receives the reverse link information from both of base stations 16a and 16b, for example, during a soft handoff situation, as is described in detail in the aforementioned 109 patent. Selector receiver system 40 combines the received reverse link data from base stations 16a and 16b and combines the data in accordance with a predetermined combination format. For example, if the reverse link data from base stations 16a and 16b are both frame estimates, selector receiver system 40 may weight the two estimates in accordance with decoder parameters provided by base stations 16a and 16b. If, for example, the reverse link frame received by base station 16a was properly received but the information from base station 16b indicates the reverse link frame was erased, then selector receiver system 40 would use the received frame estimate from base station 16a as the estimate of the reverse link frame.

Selector receiver system 40 separates the frame quality message from the improved frame estimate and provides the frame quality message to selector control processor 42. Selector control processor 42 receives the reverse link frames containing EIB messages from selector receiver system 40, and under a routine described below, determines whether to increase or decrease the forward link signal transmitted by one or both of base stations 16a or 16b. Selector transmitter system 44 receives power control commands from selector control processor 42, and provides them to power control transceiver 39 in base stations 16a and 16b. In response thereto, power control transceiver 39 provides the power control commands to power control processor 34 to control the generation of the forward link transmit power signal by the power control processor, as described more fully below.

Unless described otherwise below, the construction and operation of the various blocks shown in FIG. 2 are of conventional design. As a result, such blocks need not be described in further detail herein, as they will be understood by those skilled in the relevant art. Such description is omitted for purposes of brevity and so as not to obscure description of the present invention. Any modifications necessary to the blocks of communications system 10 in FIG. 2 can be readily made by one skilled in the art based on the detailed description provided herein.

Henceforth, much of the description of the present invention is described with respect to only a single base station 16a. Unless otherwise noted herein, the description applies equally to second base station 16b.

Figure 3:
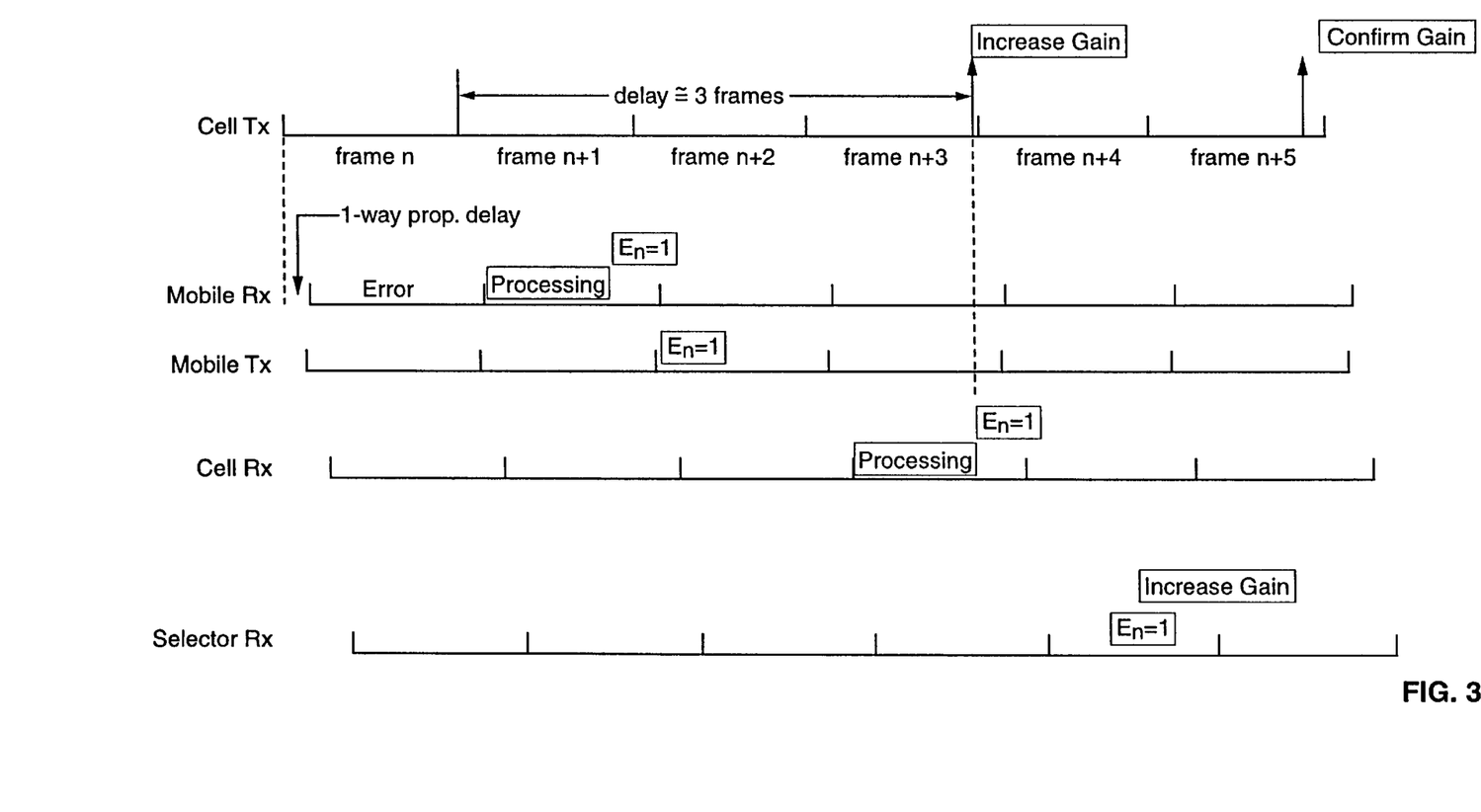
FIG. 3 is a timing diagram showing delays inherent in the closed loop power control system of FIG. 1 when a mobile station determines an error from a forward transmission signal from a base station.

Referring to the timeline of FIG. 3, delays typical in communications system 10 will be described. If base station 16a transmits a current frame (frame n), mobile station 12 receives that frame a small one-way propagation delay later. Because of the time necessary to demodulate and attempt to decode the frame, mobile station 12 does not determine that frame n is erroneous until one frame later (frame n+1), at which time it generates an EIB message or error bit $E_n$ =1. One frame thereafter (frame n+2), mobile station 12 transmits the error bit $E_n$ =1. During the next frame (frame n+3), base station 16a processes the error bit $E_n$ =1, and increases the forward link signal gain. Therefore, as shown in FIG. 3, if an error occurs during mobile station 12's receipt of frame n, it is not until three frames later (frame n+3) that base station 16a increases the forward link signal gain. As a result, the subsequent frame (frame n+4) is transmitted by base station 16a at the increased power level.

During the same frame that base station 16a processes the error bit $E_n$=1 (frame n+3), the base station also transmits the error bit to base station controller 14. Base station controller 14, however, does not process the increase in gain of the forward link signal until one frame thereafter (frame n+4). Still one frame later (frame n+5), base station controller 14 communicates the power control command to base station 16a, which confirms that the increase in gain was proper or provides proper adjustment (as described below). The adjustment to the transmission power in response to the power control command from base station controller 14 will not be applied until frame n+6. The timing diagram illustrates the typical two-frame additional delay which would result from allowing base station controller 14 to have sole control of the transmission power from base stations 16a and 16b.

Figure 4:
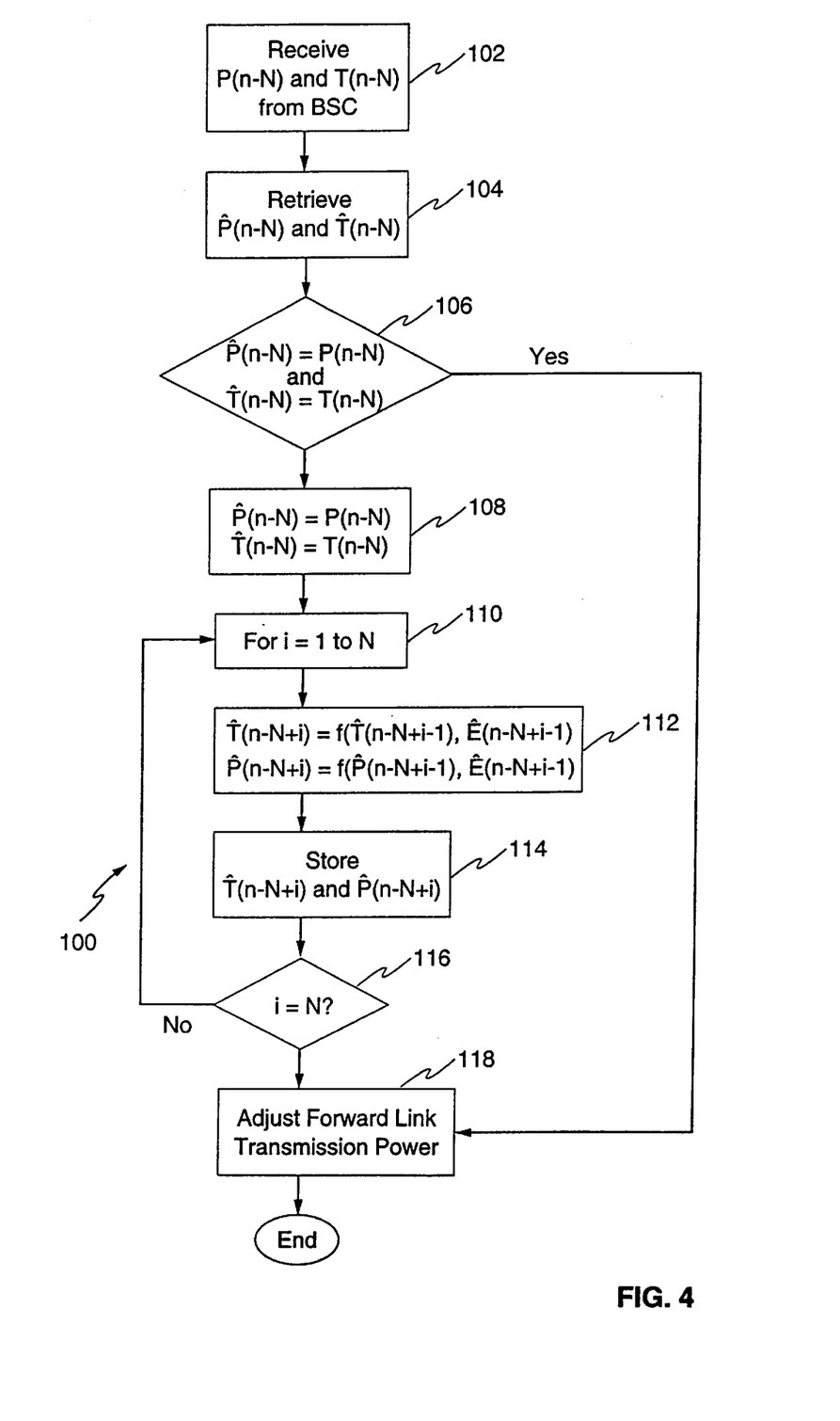
FIG. 4 is an exemplary flow diagram of a method for determining the transmission power of forward link transmissions from the base station to the mobile station under the present invention.
Figure 5:
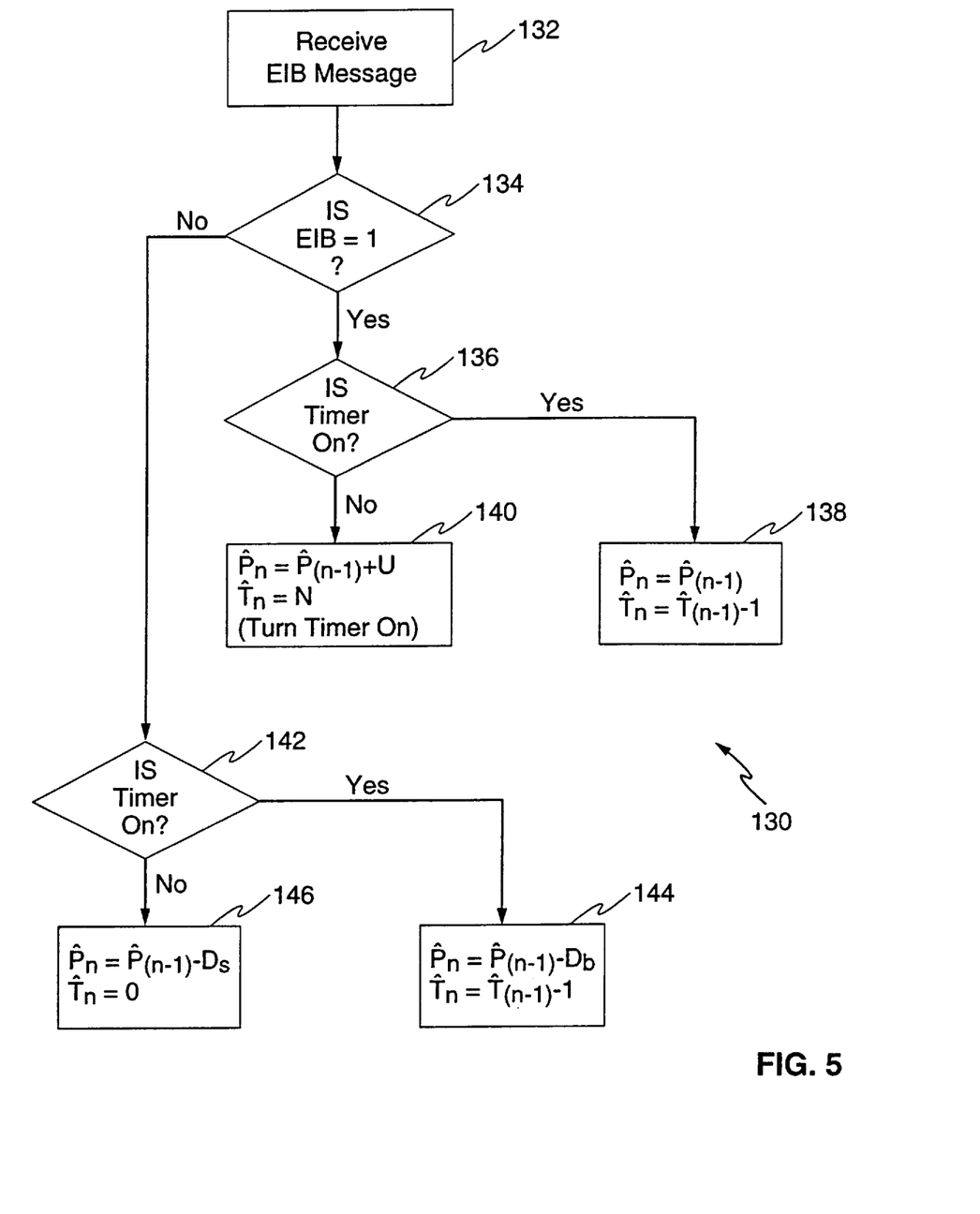
FIG. 5 is an exemplary flow diagram of a method for adjusting the transmission power of forward link transmissions from the base station to the mobile station under the present invention.

Referring to the flowchart of FIG. 4, routine 100 is performed by power control processor 34 in base station controllers 16a and 16b and takes into account this three-frame delay in increasing gain in response to a received EIB message. In general, those skilled in the relevant art can create source code based on the flowcharts and detailed description provided herein. Routine 100 is preferably stored in memory (not shown) that forms part of power control processor 34.

In general, power control processor 34 receives the power control data, including the EIB messages, from reverse link receiver system 32 and generates a timer value T, and a transmission power value P that is provided to forward link transmitter system 36 as a forward link transmit power signal. In response thereto, forward link transmitter system 36 increases or decreases the power of the forward link signal.

In response to frames that mobile station 12 is unable to successfully decode, mobile station 12 generates EIB messages having a value of 1 for each erased frame, and transmits these messages back to base station 16a over the reverse link signal. An EIB message value of 1 after a previous sequence of zeros can indicate one of two general conditions: short-term or long-term degradation of the forward link propagation path. Subsequent EIB message values can help distinguish between these two conditions. A frame error followed immediately by one or more properly received frames indicates the former. A frame error followed by subsequent errors indicates the latter. However, under the latter condition, the gain should not be immediately raised, because of the three frame feedback delay, until base station 16a receives a new EIB message reflecting the performance of the forward link signal resulting from the increase in transmission. Once this delay period is over, base station 16a should increase the forward link signal transmission gain whenever the base station receives another EIB message of 1. Otherwise, the gain should be decreased.

As shown implicitly in FIG. 3, there are two groups of time-shifted versions of the EIB messages from mobile station 12. One group is received at one or more base stations 16a and 16b. This group of EIB messages can be unreliable, but has only a three frame delay. The other group of EIB messages is received at base station controller 14, and results from all available information, i.e., at times information from a plurality of base stations, such as two base stations 16a and 16b. This group of EIB messages is delayed by four frames, but is more reliable, as explained herein.

Each base station 16a and 16b, under routine 100, can determine the gain of its forward link signal based on the EIB messages it receives on the reverse link signal from mobile station 12. Some of the EIB messages that base stations 16a and 16b receive can be unreliable, with a 10% or higher erasure rate, such as during soft handoff with one improving and one worsening reverse link signal. In other words, one base station 16a or 16b can fail to receive an EIB message, and instead, simply substitute a default value. In the exemplary embodiment, the default value of the EIB is a zero value indicating that mobile station 12 had properly received the forward link signal.

Base station controller 14, however, receives both of the EIB messages from power control transceivers 39 of base stations 16a and 16b. If, for example, base station 16a receives an EIB message value of 1 from mobile station 12, but base station 16b receives an erasure for the current frame, and thus fails to receive the EIB message, base station 16b provides an EIB message value of 0 to base station controller 14. Since base station controller 14 receives the proper EIB message value of 1 from base station 16a, but receives an indication of a frame erasure from base station 16b, the base station controller computes and provides the correct EIB message as power control commands to base station 16b. In response thereto, base station 16b corrects its current transmission power value (and timer value) under routine 100 as described below.

Therefore, routine 100 of FIG. 4 begins in step 102 where power control processor 34 receives from selector control processor 42 the transmission power value P and a timer value T, both of which correspond to a previous frame as a result of a time delay of N frames (i.e., P(n−N) and T(n−N), respectively). For example, under the exemplary time delays of FIG. 3, the time delay N is equal to 2, which corresponds to the two frame lag between the processing and transmitting of the EIB message by base station 16a to base station controller 14, and the receipt of the confirmation of such gain by the base station from the base station controller.

In step 104, power control processor 34 retrieves its previously calculated power and timer values $\hat{P}(n−N)$ and $\hat{T}(n−N)$, respectively. In step 106, power control processor 34 compares its retrieved power and timer values to those received from base station controller 14. If the values are equal (i.e., $\hat{P}(n−N)=P(n−N)$ and $\hat{T}(n−N)=T(n−N)$), then routine 100 loops to step 118 where power control processor 34 calculates the transmission power for the forward link signal and transmits the appropriate forward link transmit power signal, without regard to the corrected timer and power values for base station controller 14, to forward link transmitter system 36 under a routine described below. However, if the transmission power and timer values are unequal in step 106, then in step 108, power control processor 34 sets the retrieved transmission power and timer values to those received from base station controller 14.

In step 110, power control processor 34 initializes a counter (i.e., sets i to 1). In step 112, power control processor 34 recalculates previously computed transmission power and timer values for frames subsequent to those corresponding to the transmission power and timer values received from base station controller 14 in step 102. For example, if power control processor 34 in step 108 updated the transmission power and timer values as $\hat{P}(n−N)$ and $\hat{T}(n−N)$ in step 108, then in step 112, the power control processor under a predetermined function corrects or adjusts subsequent transmission power and timer values $\hat{T}(n−N+i)$ and $\hat{P}(n−N+i)$, in accordance with the following equations:

$$\hat{T}(n-N+i)=f_1(\hat{T}(n-N+i-1),\hat{E}(n-N+i-1))\hat{P}(n-N+i)=f_2(\hat{P}(n-N+i-1),\hat{E}(n-N+i-1)), \quad (1)$$

where $\hat{E}(t−N+i−1)$ is the EIB message received during the previous frame (i.e., frame (n−N) during the first iteration of step 112).

The predetermined function employed by equation (1) for the timer values T preferably sets the timer value for a given past frame to a value it should have had. For example, if an EIB message of 1 was received at frame (n−N), and the timer value is to be reset to a value of 3 for this frame (n−N), then the subsequent frame (n−N+1) would have a timer value of 2. Therefore, in step 112, power control processor 34 would establish the subsequent timer value $\hat{T}(n−N+2)=2$.

Alternatively, if an EIB message of zero was received at frame (n−N), and the timer value is to be at a value of 2 for this frame (n−N), then the subsequent frame (n−N+1) would have a timer value of 1 as the timer counts down to zero. Therefore, in step 112, power control processor 34 would establish the subsequent timer value $\hat{T}(n−N+1)=1$. The functions under equation (1) for transmission power P are explained below with respect to Table 1.

In step 114, power control processor 34 stores the computed subsequent transmission power and timer values $\hat{P}(t−N+i)$ and $\hat{T}(n−N+i)$. In step 116, power control processor 34 determines whether i is equal to N under the counter. If not, then power control processor 34 repeats steps 110, 112, 114 and 116 until i is equal to N and the counter counts out.

In step 118, power control processor 34 adjusts the forward link transmission power based on the computed transmission power value. As noted above, a frame error rate (FER) of 1% is preferred under CDMA communication system 10 of the present invention. Under a 1% FER, base station 16a should transmit the forward link signal at a slowly decreasing transmission gain (e.g., 1/100 of a dB), and at an increased gain (e.g., 1 dB) whenever an EIB message indicating an error is received.

Overall, routine 100 under which base station controller 14 and base station 16a operate preferably provides a basic goal of allowing base station 16a to initially process a currently received frame without input from base station controller 14, so as to reduce a number of erroneous frames due to reverse link erasures. Furthermore, the present invention preferably allows base station controller 14 to have ultimate control to optimize power control in light of reverse link errors. Moreover, the exemplary embodiment of the present invention preferably provides three additional, overall goals: first, to minimize the number of frames when the short-term FER is above 1%; second, to maintain a FER of 1% over a reasonably long term; and, third, to minimize the power consumption of the forward link signal.

The long-term 1% FER (second goal) is achieved by letting the forward link signal gain stay above a desirable level 99% of the time and let it dip below this level only 1% of the time. This is generally accomplished by letting the gain go up one relatively large step whenever an EIB message of 1 is received on the reverse link signal. The gain is gradually decreased if no further EIB messages of 1 are received. The forward link signal will eventually drop back in approximately 100 frames to the original level that resulted in a frame error. This will likely lead to another EIB message value of 1 to cause the gain to again go up in a relatively large step. As frame errors (erasures) drive the gain higher, and the lack of such frame errors drive it lower, the forward link signal gain should approach the desired FER level of 1%, assuming the forward link signal gain is not increased too quickly.

To achieve the first goal, the forward link signal gain should be increased quickly at the first sign of a worsened channel (i.e., an EIB message value of 1). To achieve the third goal, base stations 16a and 16b should reduce the forward link signal gain as this channel improves. As noted above, however, the three-frame lag between a frame error and an increase in the forward link signal gain makes the first and second goals difficult to achieve.

Therefore, to achieve these goals, power control processor 34 adjusts the forward link transmission power based on the following table.

TABLE 1

| Error Value $\hat{E}(n - N)$ | Timer | Forward Link Transmission Power and Timer Value |
|---|---|---|
| 1 | off | $\hat{P}_n = \hat{P}_{n-1} + U$ |
|   |   | $\hat{T}_n = N$ (turn timer on) |
| 0 | off | $\hat{P}_n = \hat{P}_{n-1} - D_s$ |
|   |   | $\hat{T}_n = 0$ |
| 1 (or erased previous reverse link frame $E_{n-1}$) | on | $\hat{P}_n = \hat{P}_{n-1}$ |
|   |   | $\hat{T}_n = \hat{T}_{n-1} - 1$ |
| 0 | on | $\hat{P}_n = \hat{P}_{n-1} - D_b$ |
|   |   | $\hat{T}_n = \hat{T}_{n-1} - 1$ |

If N=4, then E(n−4) corresponds to the EIB message indicating the erasure of frame n−4 on the forward link signal. Base station 16a receives this EIB message from mobile station 12 at the end of frame n−1. Under Table 1, if an erasure occurred during a frame occurring four frames previously ($\hat{E}(n-4)$), and the timer is off, then the forward link transmission power $\hat{P}_n$ is equal to the previous transmission power value ($\hat{P}_{n-1}$) plus a relatively large increase value U (e.g., 1 dB). However, if the timer was on, or power control processor 34 received an erasure for the previous frame in the reverse link signal, then no adjustment of the current forward link transmission power is made (i.e., $\hat{P}_n = \hat{P}_{n-1}$) If the timer is on, but $E_{n-4}$ is equal to 0, then the current forward link transmission power $\hat{P}_n$ is set to the previous value minus a relatively large power decrease factor $D_b$. Alternatively, if the timer was off and no erasure occurred during such a previous frame, then the current forward link transmission power $\hat{P}_n$ is equal to the previous transmission power value minus a small attenuation value $D_s$.

In a preferred embodiment, $D_b$ is greater than $D_s$, but less than U. Preferably, $D_b$ satisfies the following condition:

$$3D_b < U, \qquad (2)$$

while $D_s$ preferably satisfies the following condition:

$$D_s = [U - 3D_b]/96. \qquad (3)$$

The conditions (2) and (3) above are simply exemplary, and the present invention can provide other conditions for the power decrease factor $D_b$ and attenuation value $D_s$.

As can be seen from Table 1, the forward link transmission power will only be increased when the timer is off (i.e., set to 0 or a negative value). When the timer is off and an EIB message value of 1 is received, the timer $\hat{T}$ is reset to a value N corresponding to the time delay between a recognized error in the forward link signal (an EIB value of 1) and an increase in gain by base station 16a. For the example shown in FIG. 3, N is equal to three frames (N=3). The timer $\hat{T}$ is then reduced by one frame on each subsequent frame boundary until it decrements to zero after the initial EIB value of 1.

Referring to the flow chart of FIG. 4, an exemplary routine 130, performed by power controlled processor 34, adjusts the forward link transmission power in accordance with Table 1 to monitor and determine proper forward link transmission power when the mobile station is not in soft handoff. Routine 130 is employed by selector control processor 42. In step 132, power control processor 34 receives the current EIB message. In step 134, power control processor 34 determines whether the EIB message has a value of 1 (indicating a frame erasure). If the EIB message has a value of 1, then in step 136, power control processor 34 determines whether the timer is on. If the timer is on, then in step 138, power control processor 34 sets the current forward link transmission power $\hat{P}_n$ to the previous transmission power value $\hat{P}_{n-1}$. Additionally, power control processor 34 in step 138 decrements the timer $\hat{T}$ by 1 (i.e., $\hat{T} = \hat{T}_{n-1} - 1$). Alternatively, if power control processor 34 determines in step 136 that the timer is off, then in step 140, power control processor 34 sets the forward link transmission power $\hat{P}_n$ to the previous transmission power value plus the large increase value U. Additionally, power control processor 34 turns the timer $\hat{T}_n$ on (i.e., sets $\hat{T}_n$ to the delay value N).

If power control processor 34 determines in step 134 that the EIB message has a value of 0, then in step 142, power control processor 34 again determines whether the timer is on. If the timer is on, then in step 144, power control processor 34 sets the forward link transmission power $\hat{P}_n$ to the previous value minus the power decrease factor $D_b$. Additionally, power control processor 34 in step 144 decrements the timer $\hat{T}_n$ by 1. If power control processor 34 determines in step 142 that the timer is off, then in step 144 power control processor 34 sets the forward link transmission power $\hat{P}_n$ to the previous transmission power value minus the attenuation value $D_s$. Additionally, power control processor 34 maintains the timer in an off state (i.e., $\hat{T}_n = 0$).

Importantly, base station 16a under the present invention can immediately respond to an EIB message value of 1 from mobile station 12 and increase the forward link transmission power, if the timer is off, under step 118. Additionally, base station 16a can two frames later, after it has received corrected transmission power (and timer value) commands from base station controller 14, confirm or adjust the current forward link transmission power. For example, if during frame n+3, base station 16a determined to increase the forward link transmission power, and during frame n+4 determined from power and timer value commands from base station controller 14 that the transmission power should not have been increased, base station 16a during frame n+5 then appropriately decreases the forward link transmission power based on the power commands. Similarly, base station 16a appropriately adjusts the timer value by, for example, turning the timer off (to a value of zero), based on the timer value commands.

Figure 6:
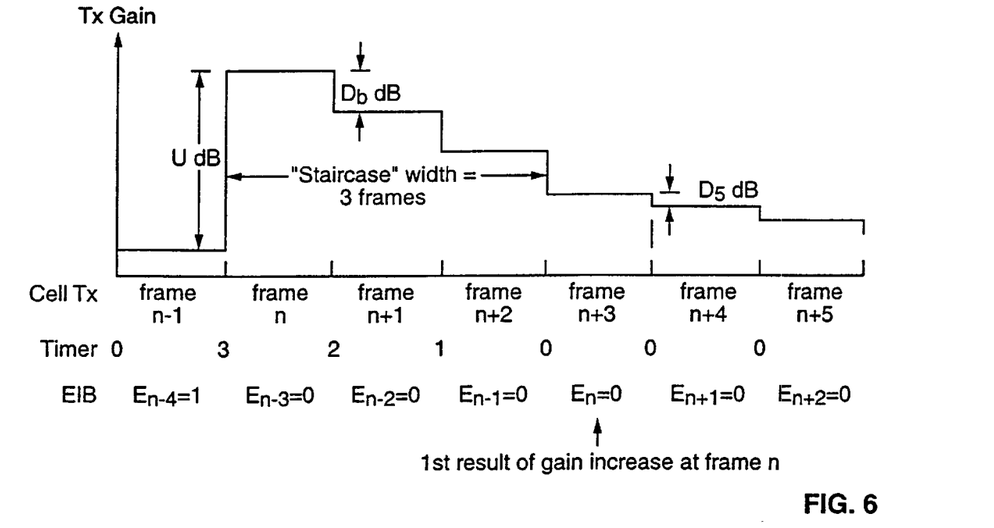
FIG. 6 is a wave form diagram illustrating a change in transmitter gain by a base station based on a received erasure indicator bit sequence of 1000000 over a period from frame n−1 to n+5.

Referring to FIG. 6, an exemplary forward link transmission power waveform is shown, which is produced by base station 16a in response to a string of EIB messages 1000000 that can occur with a deep channel fade, but no change in the general channel condition (i.e., short-term channel degradation). Power control processor 34 first receives the EIB message value of 1 ($E_{n-4}=1$) at frame n−1. Since the timer $\hat{T}$ is set to 0, base station 16a under Table 1 increases the forward link transmission power by a value of U. The timer $\hat{T}$ is also set to a value of 3. Thereafter, for frames n through n+3, power control processor 34 receives EIB message values of 0 but the timer is on (albeit decrementing). As a result, the forward link transmission power is reduced by the relatively large attenuation factor $D_b$. Thereafter, for frames n+4 and n+5, the timer is off, and power control processor 34 receives EIB message values of 0. Therefore, power control processor 34 decreases the forward link transmission power by the small attenuation factor $D_s$. At frame n+3, power control processor 34 receives and processes an EIB message from mobile station 12 that corresponds to the increase in transmission power of the forward link signal during frame n.

Figure 7:
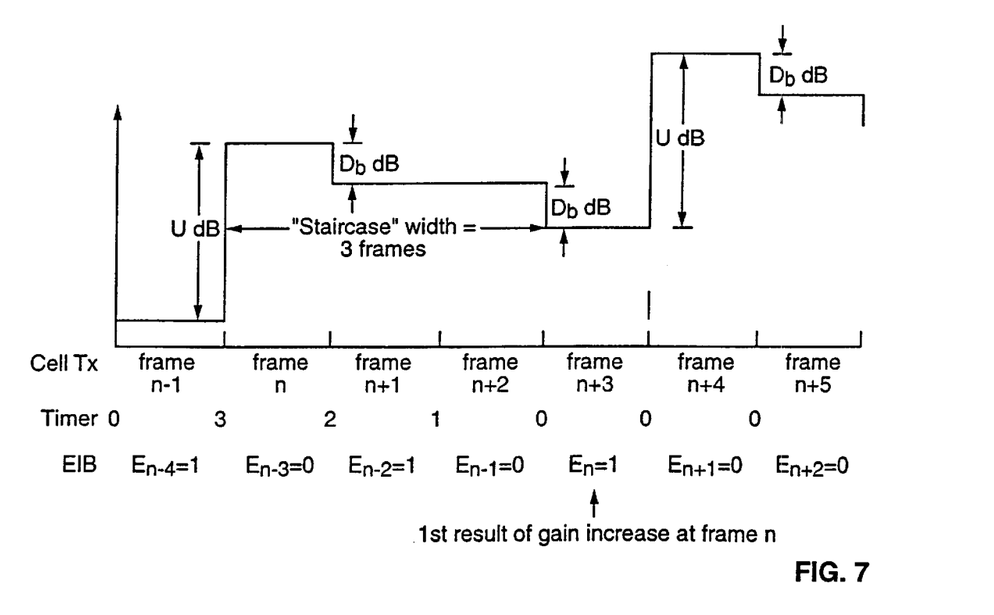
FIG. 7 is a wave form diagram illustrating a change in transmitter gain by a base station based on a received erasure indicator bit sequence of 1010100 over a period from frame n−1 to n+5.

Referring to FIG. 7, an exemplary forward link transmission power waveform is shown, which is produced by base station 16a in response to a string of EIB messages 1010100 that can result from a worsened forward channel condition (i.e., long-term channel degradation). As in the waveform of FIG. 6, power control processor 34, having a timer value of 0, increases the forward link transmission power by a value of U in response to the initial EIB message value of 1. During frame n+1, power control processor 34 receives an EIB message of 1 while the timer is on. As a result, under routine 130, power control processor 34 does not again increase the power, but maintains the current transmission power value for frame n+2 as the same power value for the frame n+1. During frame n+3, the timer is off (at a 0 value), and power control processor 34 receives an EIB message value of 1, and therefore, the power control processor again increases the forward link transmission power by a value of U.

Selector control processor 42 can perform portions of routine 100 as described above, and therefore, for purposes of brevity, is not repeated herein. In general, selector control processor 42 determines an improved estimate of each frame and possible erasures. As a result, base station controller 14 can act as a backup for routine 100 performed by power control processors 34 in base stations 16a and 16b. If the target frame error rate is 1%, then mobile station 12 can be communicating with base stations 16a and 16b at a 10% FER to each station. In essence, with an FER of 10%, one out of every ten frames are lost, and thus mobile station 12 transmits one out of every ten EIB messages as having a 1 value. By distributing the power control of the forward link to base station controller 14, the base station controller can combine the EIB messages received by base stations 16a and 16b to provide a combined FER of 1%.

If the feedback loop between base stations 16a and 16b and base station controller 14 is operating properly under routines 100 and 130, then the forward link transmission power gain at each base station would be within $U+D_b+D_s$ from each other, since they can differ by at most two erased or erroneous EIBs. Such a maximum difference in gain occurs when an earlier frame has not been received correctly, and the timer is on. Assuming at frame n both base stations 16a and 16b have the identical correct gain, one base station can adjust its forward link transmission power gain lower by $D_b$ in the next frame n+1, and thereafter in the subsequent frame n+2 reduce the gain by $D_s$ after the timer turns off. The other base station can hold its gain for the next frame n+1 and then increase the gain by U in the subsequent frame n+2.

As noted above, each base station 16a and 16b preferably provides "immediate" correction to its forward link transmission power, so as to compensate for part of the delay (the delay from mobile station 12 and base stations 16a and 16b), even though it is desirable to have each base station transmit at the same power, making it easier for mobile station 12 to receive the forward link signals. By permitting base stations 16a and 16b a level of autonomy avoids the five frame delay between mobile station 12 and base station controller 14. In essence, a two frame delay benefit is realized under this autonomous scheme. Thereafter (i.e., two frames later), the base stations can adjust the forward link transmission power based on corrected signals received from base station controller 14.

In an alternative embodiment, power control processors 34 in base station 16a and 16b can not perform routine 100, and rely solely on selector control processor 42. Under such an alternative embodiment, selector control processor 42 under routine 100 calculates all of the correct timer and transmission power values, and relays them to power control processors 34 of base stations 16a and 16b. Under such an alternative embodiment, the timer length N must be changed from 3 to 5, to compensate for the two frame additional delay in transmission between base stations 16a and 16b, and base station controller 14.

Although specific embodiments of, and examples for, the present invention are described herein for illustrative purposes, various equivalent modifications can be made without departing from the spirit and scope of the invention, as will be recognized by those skilled in the relevant art. The power control routines described in detail above are exemplary, and those skilled in the relevant art can create similar routines under the teachings and concepts of the present invention.

The teachings provided herein of the present invention can be applied to other communication systems, not necessarily the exemplary CDMA communication system described above. For example, while the present invention has been generally described above as being employed in CDMA communication system 10, the present invention is equally applicable to other digital or analog cellular communication systems. The present invention can also be modified, if necessary, to employ the systems, circuits and concepts of the various patents described above.

These and other changes can be made to the invention in light of the above detailed description. In general, in the following claims, the terms used should not be construed to limit the invention to the specific embodiments disclosed in the specification and the claims, but should be construed to include any communication system that operates in accordance with the claims to provide transmission power control. Accordingly, the invention is not limited by the disclosure, but instead its scope is to be determined entirely by the following claims.

We claim:

1. In a communication system having at least a first base station, a base station controller, and at least one user station, wherein a system user of said user station transmits communication signals to and receives communication signals from said first base station, a method for controlling transmission signal power of transmitted communication signals for each base station, the method comprising the steps of:
   at said first base station, receiving a signal quality message from said user station, said signal quality message indicating a quality of a communication signal received by said user station from said first base station;
   at said first base station, transmitting a first signal quality signal to said base station controller, said first signal quality signal being based on said received signal quality message;
   at said base station controller, calculating a first power level command based on said first signal quality signal;
   at said base station controller, transmitting said first power level command to said first base station; and
   at said first base station, transmitting a subsequent communication signal at a first power level based on said first power level command;
   wherein the step of transmitting said first power level command includes transmitting a transmission power value and a timer value, said transmission power value providing an indication of said first power level for said communication signal transmitted by said first base station, and wherein the step of calculating a first power level command includes the steps of:
      if said timer value is inactive and said first signal quality signal indicates an error, calculating said power level command based on an increase factor;
      if said timer value is inactive and said first signal quality signal indicates no error, calculating said power level command based on a small attenuation factor;
      if said timer value is active and said first signal quality signal indicates no error, calculating said power level command based on a large attenuation factor relative to said small attenuation factor; and
      if said timer value is active and said first signal quality signal indicates an error, setting said power level command to a previous power level command.

2. The method of claim 1 wherein said timer value indicates a period during which said first base station is prohibited from increasing said first power level.

3. The method of claim 1 wherein said communication system includes a second base station, and wherein the method further includes the steps of:
   at said second base station, receiving said signal quality message from said user station;
   at said second base station, transmitting a second signal quality signal to said base station controller, said second signal quality signal being based on said received signal quality message;
   at said base station controller, calculating a second power level command based on said first and second signal quality signals;
   at said base station controller, transmitting said second power level command to said second base station; and
   at said second base station, transmitting communication signal at a second power level based on said second power level command.

4. The method of claim 1 wherein the step of transmitting said communication signal includes transmitting a code division multiple access (CDMA) spread spectrum signal.

5. The method of claim 1, further including the steps of:
   at said first base station, determining a local power level based on said signal quality message from said user station;
   at said first base station, comparing said local power level to said first power level command based on a predetermined operational relationship; and
   adjusting said local power level if said comparison of said local power level to said first power level command corresponds to said predetermined operational relationship.

6. The method of claim 1 wherein said timer value indicates a period during which said first base station is prohibited from increasing said first power level, wherein said period is a period of delay occurring between the steps of receiving said signal quality message and transmitting said communication signal.

7. The method of claim 1 wherein the step of receiving a signal quality message from said user station includes receiving an erasure indicator bit that indicates that a previous frame in said communication signal contains erasures, and indicating that said first base station should increase a current power level of said communication signal, and wherein said step of transmitting a first signal quality signal includes transmitting said signal quality message received by said first base station.

8. In a communication system having a base station controller and at least one user station, wherein said user station transmits and receives communication signals and transmits a signal quality message indicating a quality of said received communication signals, a base station comprising:
   a transmitter that transmits said communication signals to said user station at a power level;
   a receiver that receives said signal quality message from said user station, said signal quality message at times providing an indication to change said power level;
   a power command receiver configured to receive from said base station controller a transmission power value and a timer value; and
   a power control processor coupled to said transmitter, receiver and power command receiver that alters said power level for said communication signals transmitted by said transmitter based on one of said transmission power value and said signal quality message, and prohibits said power level from increasing direction during a period based on said timer value despite said indication by said signal quality message to change said power level;
   wherein said power control processor alters said power level based on an increase factor if said timer value is inactive and said signal quality message indicates an error, alters said power level based on a small attenuation factor if said timer value is inactive and said signal quality message indicates no error, alters said power level based on a large attenuation factor relative to said small attenuation factor if said timer value is active and said signal quality message indicates no error, and sets said power level to a previous power level if said timer value is active and said signal quality message indicates an error.

9. The base station of claim 8 wherein said transmitter transmits said communication signal as a wireless code division multiple access (CDMA) spread spectrum signal.

10. The base station of claim 8 wherein said power control processor is configured to determine a local power level based on said signal quality message, compare said local power level to said transmission power value based on a predetermined operational relationship, and adjust said local power level if said comparison of said local power level to said transmission power value corresponds to said predetermined operational relationship.

11. The base station of claim 8 wherein said period is a period of delay occurring between transmission of said communication signals to said user station, and receipt of said signal quality message from said user station.

12. In a communication system having at least a first base station, a base station controller, and at least one user station, wherein a system user of said user station transmits to and receives from said first base station communication signals, a method for controlling transmission signal power of transmitted communication signals at each of said base stations, the method comprising the steps of:

receiving a signal quality message from said user station, said signal quality message indicating a quality of a communication signal received by said user station from said first base station;

transmitting said signal quality message to said base station controller;

receiving a first power level command from said base station controller, said first power level command being based on said signal quality message; and transmitting said communication signal at a first power level based on said first power level command;

wherein said step of receiving said first power level command includes receiving a transmission power value and a timer value, said transmission power value providing an indication of said first power level for said communication signal transmitted by said first base station, and wherein the step of transmitting said communication signal includes the steps of:

if said timer value is inactive and said first signal quality message indicates an error, transmitting said communication signal based on an increase factor;

if said timer value is inactive and said first signal quality message indicates no error, transmitting said communication signal based on a small attenuation factor;

if said timer value is active and said first signal quality message indicates no error, transmitting said communication signal based on a large attenuation factor relative to said small attenuation factor; and if said timer value is active and said first signal quality message indicates an error, transmitting said communication signal at said power level based on a previous power level.

13. The method of claim 12 wherein said timer value indicates a period during which said first base station is prohibited from increasing said first power level.

14. The method of claim 12 wherein said communication system includes a second base station, and wherein the method further includes the steps of:

at said second base station, receiving said signal quality message from said user station;

at said second base station, transmitting another signal quality message to said base station controller, said another signal quality message being based on said received signal quality message;

at said second base station, receiving a second power level command from said base station controller, said second power level command being based on said signal quality message and said another signal quality message; and at said second base station, transmitting said communication signal at a second power level based on said second power level command.

15. The method of claim 12 wherein the step of transmitting said communication signal includes transmitting a code division multiple access (CDMA) spread spectrum signal.

16. The method of claim 12, further comprising the steps of:

determining a local power level based on said signal quality message from said user station;

comparing said local power level to said first power level command based on a predetermined operational relationship; and adjusting said local power level if said comparison of said local power level to said first power level command corresponds to said predetermined operational relationship.

17. The method of claim 12 wherein said timer value indicates a period during which said first base station is prohibited from increasing said first power level, wherein said period is a period of delay occurring between the steps of receiving said signal quality message and transmitting said communication signal.

18. The method of claim 12 wherein the step of receiving a signal quality message from said user station includes receiving an erasure indicator bit that indicates that a previous frame in said communication signal contains erasures, and indicating that said first base station should increase a current power level of said communication signal.

19. In a communication system having a base station controller and at least one user station, wherein said user station transmits and receives communication signals and transmits a signal quality message indicating a quality of said received communication signals, a base station comprising:

a transmitter that transmits said communication signals to said user station at a power level;

a receiver that receives said signal quality message from said user station, said signal quality message at times providing an indication to change said power level, said base station transmitting an error message signal to the base station controller in response to said signal quality message received at the base station;

a power command receiver configured to receive from said base station controller a transmission power value and a timer value, said transmission power value and said timer value based on said error message signal; and a power control processor coupled to said transmitter, receiver and power command receiver that alters said power level for said communication signals transmitted by said transmitter based on one of said transmission power value received from said base station controller and said signal quality message received from said user station, and prohibits said power level from increasing direction during a period based on said timer value despite said indication by said signal quality message received from said user station to change said power level;

wherein said base station and said base station controller each respond independently to said signal quality message and said error message signal, respectively, and wherein the response of the base station to said transmission power value received from said base station controller overrides the response of the base station to said signal quality message received from said user station during the period.

20. The base station of claim 19 wherein said transmission power value and said timer value are based on said signal quality message transmitted by said base station.

21. The base station of claim 19 wherein said transmission power value and said timer value are based on said signal quality message transmitted by said base station and another base station.

* * * * *